US009221472B2

(12) United States Patent
Karl et al.

(10) Patent No.: US 9,221,472 B2
(45) Date of Patent: Dec. 29, 2015

(54) MEANS OF TRANSPORT AND METHOD FOR WIRED DATA TRANSMISSION BETWEEN TWO VEHICLES WHICH ARE DETACHABLY CONNECTED TO ONE ANOTHER

(75) Inventors: Harald Karl, Fuerth (DE); Karl-Heinz Kern, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 534 days.

(21) Appl. No.: 13/810,490

(22) PCT Filed: Jul. 12, 2011

(86) PCT No.: PCT/EP2011/061841
§ 371 (c)(1),
(2), (4) Date: Jan. 16, 2013

(87) PCT Pub. No.: WO2012/007454
PCT Pub. Date: Jan. 19, 2012

(65) Prior Publication Data
US 2013/0113278 A1 May 9, 2013

(30) Foreign Application Priority Data

Jul. 16, 2010 (DE) .......................... 10 2010 027 283

(51) Int. Cl.
*B23K 11/24* (2006.01)
*H02B 1/24* (2006.01)
(Continued)

(52) U.S. Cl.
CPC ............... *B61C 3/00* (2013.01); *B61L 15/0036* (2013.01); *H04L 12/4625* (2013.01); *H04L 69/40* (2013.01); *H04L 2012/40293* (2013.01); *Y10T 307/747* (2015.04); *Y10T 307/766* (2015.04)

(58) Field of Classification Search
CPC ... B61C 3/00; B61L 15/0036; H04L 12/4625; H04L 12/46; Y10T 307/747; Y10T 307/766
USPC .................................................... 307/9.1, 112
See application file for complete search history.

(56) References Cited

U.S. PATENT DOCUMENTS 7,577,668 B2 8/2009 Sato et al.
2003/0179817 A1 9/2003 Plattner et al.
(Continued)

FOREIGN PATENT DOCUMENTS

CN 201023495 Y 2/2008
CN 1016022371 A 12/2009
(Continued)

OTHER PUBLICATIONS

Schmitz, B., "Informations- und Steuerungstechnik auf Schienenfahrzeugen" Elektronik Industrie, Aug. 9, 2008, pp. 20-22.
(Continued)

*Primary Examiner* — Carlos Amaya
(74) *Attorney, Agent, or Firm* — Laurence Greenberg; Werner Stemer; Ralph Locher

(57) ABSTRACT

A transport system or means of transport includes vehicles detachably connected to one another and a data transmission apparatus for wired data transmission between the vehicles and within the vehicles. In each vehicle the data transmission apparatus includes data coupling units for the data transmission between the respective vehicle and vehicles connected to it as well as two separate data connections connecting its two data coupling units. Each data coupling unit has four data ports as well as one or more switch units which can be used to produce different electrical connection states for the data ports. A method for data transmission in such a transport system or means of transport is also provided.

13 Claims, 2 Drawing Sheets

(51) Int. Cl.
    *B61C 3/00*     (2006.01)
    *B61L 15/00*     (2006.01)
    *H04L 12/46*     (2006.01)
    *H04L 29/14*     (2006.01)
    *H04L 12/40*     (2006.01)

(56) References Cited

U.S. PATENT DOCUMENTS

| | | |
|---|---|---|
| 2009/0195344 A1 | 8/2009 | Marvel et al. |
| 2010/0004805 A1 | 1/2010 | Denis et al. |
| 2010/0044333 A1 | 2/2010 | Marvel et al. |
| 2010/0219682 A1* | 9/2010 | Homma et al. ............ 307/9.1 |

FOREIGN PATENT DOCUMENTS

| | | |
|---|---|---|
| CN | 101754292 A | 6/2010 |
| DE | 10 2007 013 995 A1 | 9/2008 |
| EP | 1 422 833 A2 | 5/2004 |
| EP | 2 088 684 A1 | 8/2009 |
| RU | 2161817 C1 | 1/2001 |
| RU | 2264655 C2 | 11/2005 |
| WO | 9906986 A1 | 2/1999 |
| WO | 2007079501 A1 | 7/2007 |

OTHER PUBLICATIONS

Kurz, H., "Zugsteuerung mit Lichtwellenleiter-Datenübertragung für die Tribzüge Intercity-Express", Elektronische Bahnen, Oldenbourg Industrieverlag, May 1, 1989, pp. 129-134, vol. 87, No. 5, München, Germany.

Paral, T., "IP network backbone with era_transceiver, 1 GBit/s communication over automatic couplers" Nov. 21, 2009, pp. 1-31, URL: http://www.ukintpress-conferences.com/conf/09rix_conf/pdfs/Day%202/12_Thomas_Paral.pdf.

Schmitz, Barbara: Informations- und Steuerungstechnik auf Schienenfahrzeugen, Elektronik Industrie, Aug. 9, 2008, pp. 20-22—Statement of Relevance.

Kurz H R: "Zugsteuerung mit Lichtwellenleiter-Datenübertragung für die Triebzüge Intercity-Express", Mai 1, 1989, Elektrische Bahnen, Oldenbourg Industrieverlag, München, DE, pp. 129-134, XP000030209—Statement of Relevance.

\* cited by examiner

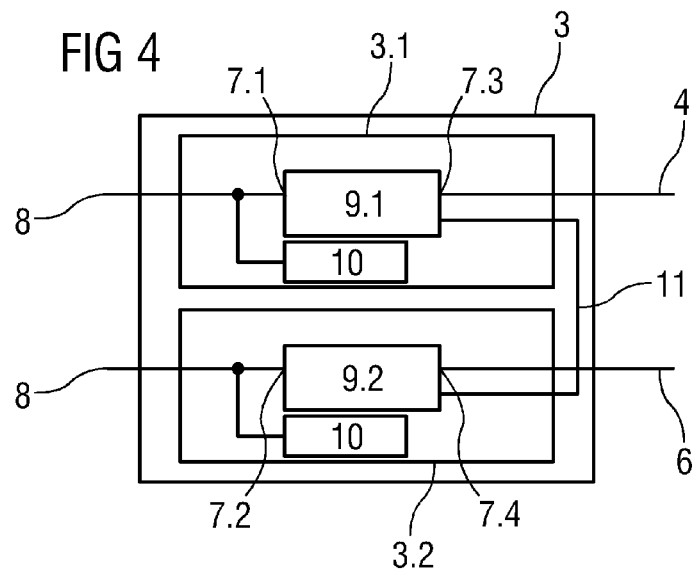
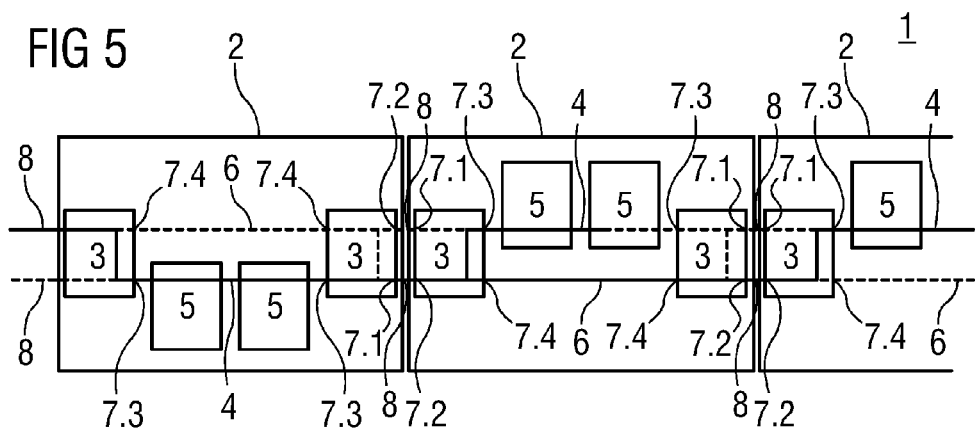

MEANS OF TRANSPORT AND METHOD FOR WIRED DATA TRANSMISSION BETWEEN TWO VEHICLES WHICH ARE DETACHABLY CONNECTED TO ONE ANOTHER

BACKGROUND OF THE INVENTION

Field of the Invention

The invention relates to a means of transport consisting of vehicles which are detachably connected to one another and a method for transmitting data in such a means of transport.

In means of transport consisting of vehicles, in particular rail vehicles, which are detachably connected to one another, data is frequently transmitted between the vehicles and within the vehicles by means of a fieldbus, which is based on a continuous wire connection.

BRIEF SUMMARY OF THE INVENTION

It is the object of the invention to specify a means of transport consisting of vehicles which are detachably connected to one another with an improved data transmission apparatus for transmitting data between the vehicles and within the vehicles as well as an improved method for transmitting data in such a means of transport.

According to the invention the object is achieved in respect of the means of transport by the features recited below and in respect of the method by the steps recited below.

Advantageous embodiments of the invention are the subject matter of the subclaims.

An inventive means of transport consists of vehicles which are detachably connected to one another with a data transmission apparatus for wired data transmission between the vehicles and within the vehicles. In the region of both ends of each vehicle the data transmission apparatus comprises respectively a data coupling unit for transmitting data between the respective vehicle and a vehicle connected to it at its respective end, in each vehicle it comprises a first data connection connecting its two data coupling units, consisting of first transmission lines and at least one segment connection unit connecting two first transmission lines and having a line topology and in each vehicle it comprises a redundant passive second data connection connecting its two data coupling units. Each data coupling unit here has four data ports, of which a first and a second are connected respectively to the corresponding data ports of a data coupling unit of another vehicle, a third is connected to the first data connection of the vehicle and a fourth is connected to the second data connection of the vehicle. Each data coupling unit also has one or more switch units, which can be used to establish different electrical connection states of the data ports. In a first connection state only the first and third data ports are connected to one another, in a second connection state only the first and fourth data ports are connected to one another, in a third connection state only the first and third and the first and fourth data ports are connected to one another, in a fourth connection state only the second and third data ports are connected to one another, in a fifth connection state only the second and fourth data ports are connected to one another and in a sixth connection state only the second and third and the second and fourth data ports are connected to one another.

According to the invention therefore each vehicle has a data coupling unit at each of its ends, which can be connected to a corresponding data coupling unit of another vehicle. This allows data to be transmitted between the vehicles by way of the data coupling units and the vehicles to be networked to one another.

The data coupling units of each vehicle are connected to one another by a first data connection and by a redundant passive second data connection. This allows the passive second data connection to be used in the event of a failure of the first data connection, in which active network components are present, so that a data transmission between the vehicles can be maintained even in such an instance.

A passive data connection here refers to a data connection without active network components.

Switching between the two data connections here is enabled by switch units of the data coupling units.

In the event of a failure of active network components in a vehicle, for example due to a fire in the vehicle, a data transmission can in particular be maintained between the vehicles of the means of transport as a result.

At least one second data connection here preferably consists of a second transmission line.

This allows the second (redundant) data connection to be embodied in a particular simple and therefore fail-safe manner. This advantageously enhances the operational reliability of the data transmission apparatus.

In one possible embodiment of the invention at least one first or second transmission line is also an optical waveguide.

This allows the length of transmission lines to be increased compared with transmission lines configured as electric cables, which allow error-free data transmission, for example in packet-oriented networks such as Ethernet networks. In particular it is thus possible to reduce the number of active network components that have to be used as intermediate stations for long transmission distances to regenerate the transmitted signals. This advantageously reduces the number of such network components and therefore also the costs they incur and also enhances the operational reliability of the data transmission apparatus, which is put at risk by a possible failure of such network components.

In one exemplary embodiment of the invention at least one data coupling unit has a switch unit having all four data ports.

Such a data coupling unit can be produced in a particularly simple and therefore economical manner. However it has the disadvantage that a failure of the switch unit also brings about failure of the corresponding data coupling unit.

Therefore in a further exemplary embodiment of the invention at least one data coupling unit comprises two switch units connected to one another, a first switch unit having the first and third data ports and the second switch unit having the second and fourth data ports.

Such a data coupling unit is only slightly more complex than a data coupling unit of the first exemplary embodiment but has the advantage over this latter that if one of the two switch units fails, data transmission is still possible by way of the second switch unit, thereby further enhancing the operational reliability of the data transmission apparatus.

In one embodiment of the invention at least one data coupling unit can be supplied with electrical energy from another data coupling unit connected to it.

This allows data coupling units to be supplied with energy by a data coupling unit of another vehicle, even if their energy supply by way of their own vehicle fails. This additionally enhances the operational reliability of the data transmission apparatus.

In a further embodiment of the invention the data transmission apparatus is configured for packet-oriented data transmission.

This allows the advantages of packet-oriented data transmission to be utilized. In particular it allows simple verification of the transmitted data in respect of its completeness and freedom from error.

The data transmission apparatus here is preferably an Ethernet data transmission apparatus.

This advantageously allows known and proven Ethernet standards and technologies to be utilized and compatibility with devices based on said standards and technologies to be achieved, so that said devices can be integrated into the network in a simple manner.

At least one data coupling unit preferably also has what is known as a power over Ethernet supply unit, which can be used to supply a data coupling unit connected to it with electrical energy.

This allows the known Ethernet technologies to be utilized in particular for the abovementioned supply of energy to data coupling units by other data coupling units.

The invention is particularly advantageously suitable for means of transport, the vehicles of which are rail vehicles, as these regularly consist of a number of vehicles and are relatively long.

The inventive method therefore provides data transmission in a means of transport with the abovementioned features, with data being transmitted between the two data coupling units of a vehicle by way of the second data connection if the first data connection fails.

This has the abovementioned advantage of enhancing the reliability of data transmission in the means of transport.

In one preferred embodiment of the method segment connection units of the means of transport are always connected to one another in a transmission-active manner in the form of a tree topology.

A connection between segment connection units is referred to as transmission-active when it is in a state, in which data can be transmitted by way of said connection.

A connection between segment connection units in the form of a tree topology is required in particular for the use of Ethernet technology and therefore has the advantage of allowing the data transmission apparatus to be used for such technology.

Further advantages, features and details of the invention are described in the following based on exemplary embodiments with reference to drawings, in which:

BRIEF DESCRIPTION OF THE SEVERAL VIEWS OF THE DRAWING

FIG. 4 shows a schematic block diagram of a second exemplary embodiment of a data coupling unit, and FIG. 5 shows segment connection units of a means of transport connected to one another in a transmission-active manner in the form of a tree topology.

DESCRIPTION OF THE INVENTION

Figure 1:
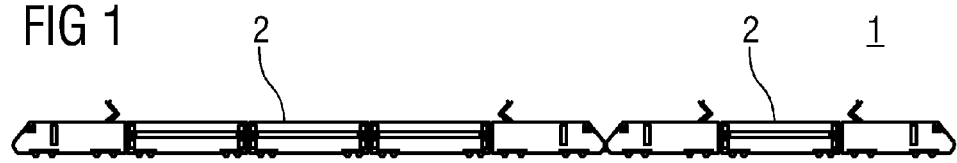
FIG. 1 shows a means of transport consisting of two rail vehicles.

Corresponding parts are shown with identical reference characters in all the figures.

FIG. 1 shows a means of transport 1 consisting of two vehicles 2 which are detachably connected to one another and which in this example are rail vehicles. The invention relates to such means of transport 1, the vehicles 2 of which can be several hundred meters long and which can in particular consist of more than two vehicles 2.

Figure 2:
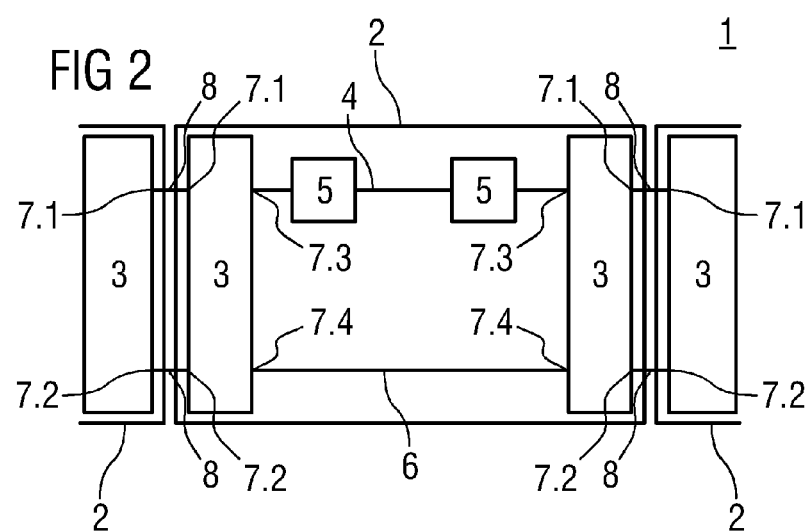
FIG. 2 shows a block diagram of a section of a data transmission apparatus for a means of transport.

FIG. 2 shows a block diagram of a section of a data transmission apparatus for a means of transport 1 consisting of a number of vehicles 2. In the region of both ends of each vehicle 2 the data transmission apparatus comprises a data coupling unit 3 for transmitting data between the respective vehicle 2 and a vehicle 2 connected to it at its respective end.

In each vehicle 2 the data transmission apparatus also comprises a first data connection connecting its two data coupling units 3, said first data connection consisting of first transmission lines 4 and segment connection units 5 respectively connecting two first transmission lines 4 and having a line topology.

In each vehicle 2 the data transmission apparatus also comprises a second transmission line 6, which forms a redundant passive second data connection connecting its two data coupling units 3.

In this exemplary embodiment the data transmission apparatus is configured as an Ethernet data transmission apparatus.

The segment connection units 5 respectively connect two first transmission lines 4 to one another, thereby regenerating the transmitted signal, to prevent or reduce signal corruption due to long transmission distances.

The transmission lines 4, 6, in particular between segment connection units 5 at large spatial distances of around 100 m, are preferably configured as optical waveguides, for example glass fiber cables. Between segment connection units 5 at shorter distances the first transmission lines 4 can also be configured as conventional electric cables, for example copper cables.

Each data coupling unit 3 has four data ports 7.1 to 7.4. A first 7.1 and second 7.2 of these are connected respectively to the corresponding data ports 7.1, 7.2 of a data coupling unit 3 of another vehicle 2 by way of electric cable connections 8, which respectively connect a first or second data port 7.1, 7.2 of a vehicle 2 electrically to a first or second data port 7.1, 7.2 of the other vehicle 2 in a detachable manner.

The data coupling units 3 forward the data between the cable connections 8 and the transmission lines 4, 6, thereby allowing switching between electrical and optical transmission media if required.

The detachable cable connections 8 are preferably each configured in the same manner, for example by means of plug connections of the same type, so that each first and second data port 7.1, 7.2 of each vehicle 2 can be connected to each first or second data port 7.1, 7.2 of each other vehicle 2 and data transmission is possible between any ends of two vehicles 2 by way of the cable connections 8. This advantageously allows a connection between two vehicles 2 at any of their ends with data being transmitted simultaneously between the vehicles 2.

A third data port 7.3 of each data coupling unit 3 of each vehicle 2 is connected to the first data connection of said vehicle 2 and the fourth data port 7.4 of each vehicle 2 is connected to the second transmission line 6 of said vehicle 2. This means that the data coupling units 3 of each vehicle 2 are connected respectively to one another by way of their third data ports 7.3 by means of a first data connection and by way of their fourth data ports 7.4 by means of a second transmission line 6.

According to the invention data is transmitted between the two data coupling units of a vehicle by way of the second transmission line 6 if the first data connection fails. A failure of the first data connection here can have a number of causes, for example non-availability of one of its first transmission lines 4 or segment connection units 5, for example due to a fire. In the event of such a failure within a vehicle 2, the data is therefore rerouted by way of the second transmission line 6 between the data coupling units 3 of said vehicle 2. This advantageously allows data transmission between vehicles 2, which are connected to one another by way of the vehicle 2 affected by the failure, even in the event of such a failure.

Corresponding control of the data transmission by way of the second transmission line 6 as a function of the transmission state of the first data connection is achieved by means of a redundancy protocol.

Figure 3:
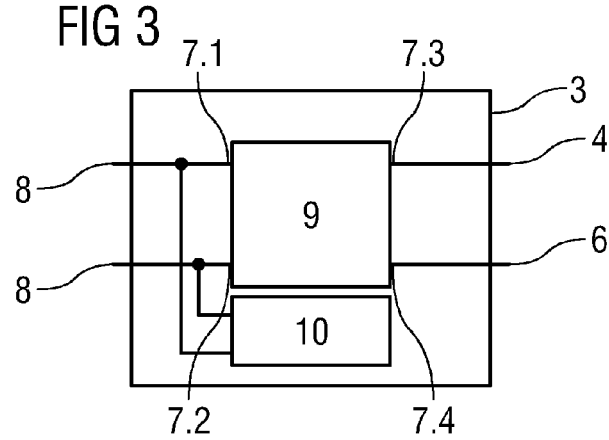
FIG. 3 shows a schematic block diagram of a first exemplary embodiment of a data coupling unit.

FIG. 3 shows a schematic block diagram of a first exemplary embodiment of a data coupling unit 3. The data coupling unit 3 has a switch unit 9 having all four data ports 7.1 to 7.4 and a power over Ethernet supply unit 10, referred to in the following as a PoE unit.

The switch unit 9 allows different electrical connection states of the data ports 7.1 to 7.4 to be established. In a first connection state only the first 7.1 and third 7.3 data ports are connected to one another, in a second connection state only the first 7.1 and fourth 7.4 data ports are connected to one another, in a third connection state only the first 7.1 and third 7.3 and the first 7.1 and fourth 7.4 data ports are connected to one another, in a fourth connection state only the second 7.2 and third 7.3 data ports are connected to one another, in a fifth connection state only the second 7.2 and fourth 7.4 data ports are connected to one another and in a sixth connection state only the second 7.2 and third 7.3 and the second 7.2 and fourth 7.4 data ports are connected to one another. The redundancy protocol thus allows data forwarding to be established between each of the cable connections 8 connected to a data coupling unit 3 and any combination of the first and second transmission lines 4, 6 connected thereto.

The PoE units 10 can be used to supply connected data coupling units 3 reciprocally with electrical energy by way of the cable connections 8 connecting them.

In one alternative embodiment however energy can also be supplied to the data coupling units 3 by way of separate electrical power contacts of the data coupling units 3 instead of the PoE units 10. The data coupling units 3 are therefore then not supplied with electrical energy by way of the cable connections 8, by way of which data is also transmitted, but by way of separate electrical lines and there is no need for the PoE units 10.

FIG. 4 shows a schematic block diagram of a second exemplary embodiment of a data coupling unit 3. In contrast to the exemplary embodiment illustrated in FIG. 3 the data coupling unit 3 in this exemplary embodiment consists of two sub-units 3.1, 3.2, each having its own switch unit 9.1, 9.2 and its own PoE unit 10. A first switch unit 9.1 of a first sub-unit 3.1 here has the first 7.1 and third 7.3 data ports and the second switch unit 9.2 of the second sub-unit 3.2 has the second 7.2 and fourth 7.4 data ports. The two switch units 9.1, 9.2 are also connected to one another by way of a sub-unit connection 11. This allows the six connection states described above also be achieved with this exemplary embodiment. The data coupling unit 3 of this exemplary embodiment has the advantage, compared with the one illustrated in FIG. 3, that if a sub-unit 3.1, 3.2 fails, data can continue to be transmitted by means of the second sub-unit 3.1, 3.2, thereby advantageously enhancing data transmission reliability.

FIG. 5 shows segment connection units 5 of a means of transport 1 connected to one another in a transmission-active manner in the form of a tree topology. Such a tree topology is required for Ethernet and is enabled by the redundancy protocol. In the illustrated example the continuously drawn transmission lines 4, 6 are transmission-active while the transmission lines 4, 6 drawn with a broken line are transmission-inactive. If a transmission-active connection fails, a connection that has hitherto been transmission-inactive is activated. The connections are reconfigured here by identifying resulting or failed Ethernet links and/or based on the result of cyclical monitoring of the connection status of connected Ethernet users (data coupling units 3 and segment connection units 5).

The invention claimed is:

1. In a transport system having vehicles detachably connected to one another and a data transmission apparatus for wired data transmission between the vehicles and within the vehicles, the data transmission apparatus comprising:

data coupling units each disposed in vicinity of a respective one of two ends of each vehicle and configured to transmit data between the respective vehicle and a vehicle connected thereto at its respective end, each of said data coupling units having at least one switch unit;

first data connections each disposed in a respective one of the vehicles and configured to interconnect two data coupling units in the respective vehicle, said first data connections each formed of two first transmission lines and at least one segment connection unit interconnecting said two first transmission lines and having a line topology;

redundant second data connections each disposed in a respective one of the vehicles and configured to interconnect said two data coupling units in the respective vehicle, said redundant second data connections being passive data connections;

each of said data coupling units of a respective vehicle having four data ports including first and second data ports respectively connected to corresponding data ports of said data coupling unit of another vehicle, a third data port connected to said first data connection of the respective vehicle and a fourth data port connected to said second data connection of the respective vehicle; and said switch units configured to establish different electrical connection states of said data ports, including a first connection state having only said first and third data ports connected to one another, a second connection state having only said first and fourth data ports connected to one another, a third connection state having only said first and third as well as said first and fourth data ports connected to one another, a fourth connection state having only said second and third data ports connected to one another, a fifth connection state having only said second and fourth data ports connected to one another and a sixth connection state having only said second and third as well as said second and fourth data ports connected to one another.

2. The transport system according to claim 1, wherein at least one of said second data connections is formed of a second transmission line.

3. The transport system according to claim 2, wherein at least one second transmission line is an optical waveguide.

4. The transport system according to claim 1, wherein at least one of said first transmission lines is an optical waveguide.

5. The transport system according to claim 1, wherein said at least one switch unit of at least one of said data coupling units is one switch unit having all four data ports.

6. The transport system according to claim 1, wherein said at least one switch unit of at least one of said data coupling units is two connected switch units including a first switch unit having said first and third data ports and a second switch unit having said second and fourth data ports.

7. The transport system according to claim 1, wherein at least one of said data coupling units can be supplied with electrical energy from another of said data coupling units connected thereto.

8. The transport system according to claim 1, wherein the data transmission apparatus is configured for packet-oriented data transmission.

9. The transport system according to claim 8, wherein the data transmission apparatus is an Ethernet data transmission apparatus.

10. The transport system according to claim 9, wherein at least one of said data coupling units has a power over Ethernet supply unit configured to be used to supply one of said data coupling units connected thereto with electrical energy.

11. The transport system according to claim 1, wherein the vehicles are rail vehicles.

12. A method for transmitting data, the method comprising the following steps:
  providing a transport system according to claim 1; and
  transmitting data between said two data coupling units of a vehicle through said second data connection if said first data connection fails.

13. The method according to claim 12, which further comprises always connecting said segment connection units of the transport system to one another in a transmission-active manner in the form of a tree topology.

* * * * *